June 9, 1953  G. P. BRIDGEFIELD  2,641,294
ELECTRIC CURRENT DISCHARGE RUBBER TIRE
Filed Oct. 2, 1950

INVENTOR.
Guillermo Palacios Bridgefield
BY
ATTORNEY.

Patented June 9, 1953

2,641,294

UNITED STATES PATENT OFFICE 2,641,294

ELECTRIC CURRENT DISCHARGE RUBBER TIRE

Guillermo Palacios Bridgefield, Mexico City, Mexico

Application October 2, 1950, Serial No. 187,849
In Mexico June 13, 1950

4 Claims. (Cl. 152—151)

This invention relates in general terms to tires for vehicles, especially rubber tires for motor vehicles and more particularly to certain useful improvements in the construction of this type of tires presenting a very important improvement or advantage over those heretofore used and known.

It is well known that particularly under certain atmospheric conditions and at certain times of the year more than at others, vehicles, because of being thoroughly insulated from the ground by the tires with which their wheels are equipped, accumulate static or dynamic electrical current which is discharged when the vehicle establishes contact with the ground directly or through some conductor, which produces a very unpleasant sensation if the conductor is a human being, especially because of its unexpectedness, said discharge being accomplished through a spark or arc. This, nevertheless, in spite of being unpleasant, has no further consequences, but there are some cases in which the discharge has been the cause of fire in the vehicle, especially since there are always fluids or inflammable substances, particularly when such substances are being transported as cargo, in which case great precautions must be taken to keep accidents from occurring.

It is the main purpose of the invention to provide a tire furnished with means to pass the electric current, that the vehicle might have accumulated, through the tire itself and discharge same electric current to the ground without any risk for the vehicle and without annoying sensations for the driver or travelers therein.

Briefly the tire of my invention substantially consists of providing the body of the tire itself, between the mass of the insulating material thereof, with wire, strips or cables, preferably metallic or of any electricity-conductor material, which being in contact with the rim or metal wheel that supports the tire, will project therefrom as much as necessary, to discharge the electric current onto the ground.

These and other details, advantages, and characteristics of the new tire of my invention will be clearly apparent in the course of the following description and the accompanying drawings, said drawings being given as an illustration thereof, the same reference numbers being used to indicate the same parts in the three figures shown.

Figures 1, 2, 3:
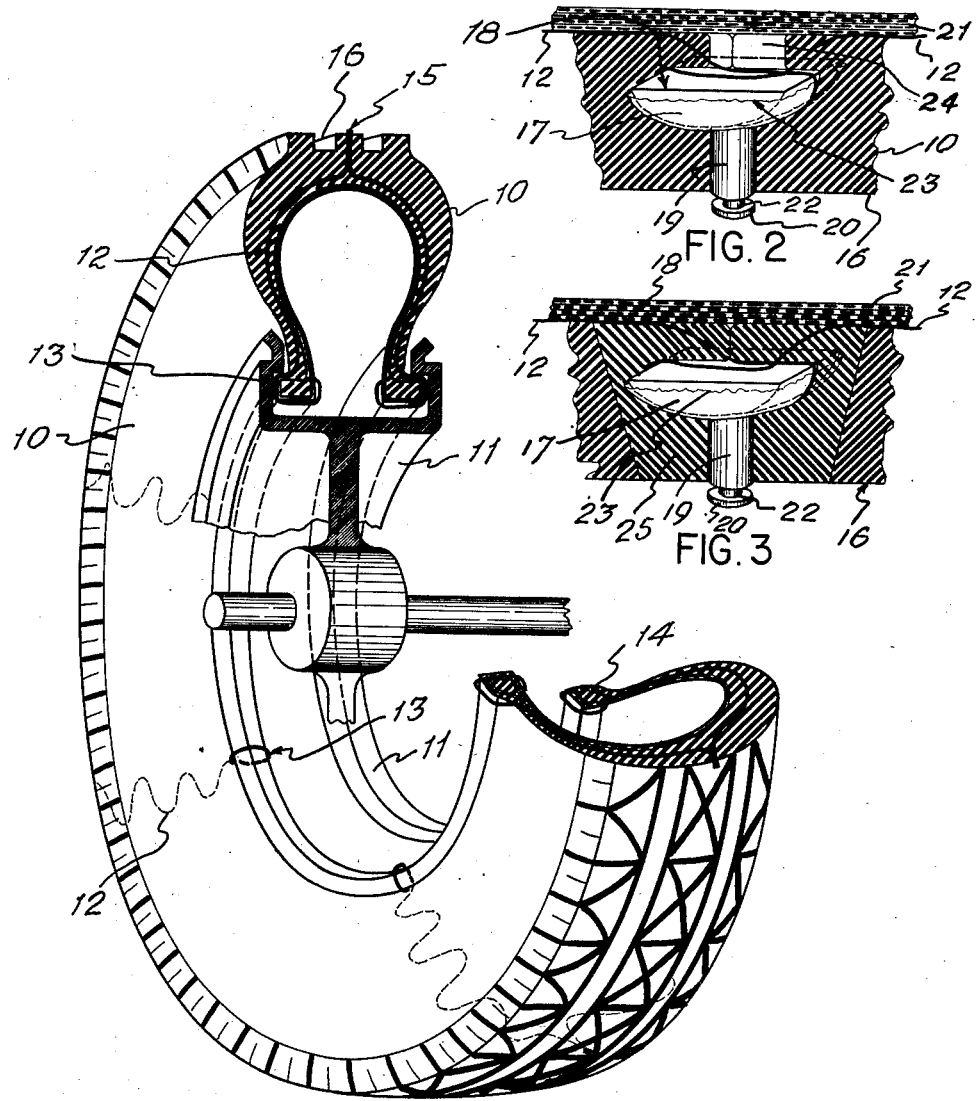
Fig. 1 is a conventional perspective view of a tire, built according to the present invention, mounted on its corresponding rim and with cross-sectional cuts, to show the inner arrangement of the wire or similar object, through which the electric discharge is effected or led to the ground.
Fig. 2 is a cut portion of the central or rolling part of a tire, showing how the invention can be carried into practice differently from the illustration in Fig. 1.
Fig. 3 is also a cut portion of the rolling part of a tire in another suitable manner showing how the invention can be carried into practice.

Before more particularly describing the improved tire of my invention, it is to be clearly understood that the drawings illustrate, in an enunciative and not restrictive manner, the specific details of how the invention can be carried into practice, yet without limiting in any manner said invention to said specific details as illustrated and described. Such variations and modifications, therefore, as may be advisable or fitting in practice, can be effected without deviating from the principles and scope of the invention, always within the extent of the claims hereinafter exposed.

Such as illustrated in the accompanying drawings and with particular reference to Fig. 1 thereof, the invention comprises a pneumatic tire 10 of the current known type, generally made in natural or synthetic rubber, either simple or vulcanized, or a similar material, said tire being shown mounted on the corresponding rim 11. To the inside of the walls and floor of said tire 10, there have been incorporated one or several wires, straps or conducting cables 12 which project by one of their ends 13 from the flange 14 of the tire to make contact with the rim 11, while by the opposite end 15 they project from the rolling surface 16 in the manner shown in said Fig. 1 of the drawings. In this way the static or dynamic electricity held by the vehicle's body is gradually discharged onto the ground by the wire or conductor 12 incorporated to the tire.

Of course the wire 12 disposed in the tire 10 in the aforesaid manner will preferably be incorporated therein during the manufacturing process and before its being vulcanized.

The end 15 of the wire 12 projecting from the rolling surface 16 of the tire 10, can terminate in a shank or button (not shown in the drawings) that will provide a more efficient contact with the ground and keep said end 15 from piercing the elastic mass of the tire as the latter is pressed down on the ground.

In order also to keep the elastic material of the tire, as the latter is pressed down, from covering the end 15 of the wire 12, which fact would impede the contact of the wire with the ground, as a new characteristic of the practical application of the invention, there is inserted in the body of the tire 10 and preferably in the thicker portion thereof corresponding to the rolling surface 16, a body 17 (Figs. 2 and 3 of the drawings) on the upper surface of which 18 are adhered or simply connected the wire or wires 12 that make contact with the rim or tire-bearing wheel 11, while by the surface looking outwardly the same body 17 is prolonged thereby forming a shank the head or button of which projects from the rolling floor 16 of the tire 10. As it may be readily understood, both, the body 17 and the shank 19 and head or button 20 may be made in metal or any other electricity-conducting material. This body 17 because of its wide surface will offer enough resistance to the pressure and resiliency of the tire material to keep the button or head 20 and the shank 19 from penetrating into the tire by the pressure thereof against the ground and a good ground contact will always be possible through the wire or wires 12 connected to the rim 11. The location of the body 17 within the tire will be at a suitable distance from the canvas reinforcing the tire, to avoid the possibility of said member or body, pushing them out of place and at the same time to avoid that the presence thereof may produce protuberances in the rolling zone of the tire.

Between the shank 19 and the head or button 20 there will preferably be a circumferential groove 22 wherein auxiliary sheets or plates may be inserted, so that as the crude tire—that is before vulcanization—is being handled, the body 17 is maintained in a correct position so that the button 20 is always outside the outer surface of the rolling belt 16, said plates to be taken off after vulcanization.

In order to keep the rubber from becoming interposed between the wire or wires 12 and the body 17, during vulcanization, thereby causing a poor contact or connection, a thin metallic sheet made in tin or other similar material may be provided to cover said wire or conductor 12 on the surface 18 of the body 17.

The chamber 24 resulting from introducing the body 17 into the mass of the material forming the tire 10 has the purpose of providing an area of less resistance of the same material as that forming the tire, so that said body 17 may be introduced more or less to compensate for the difference in wear between said body 17 and the material of which the tire 10 is made.

As another further variation of the practical application of the invention and in order to secure a better contact or connection between the conductors 12 and the body 17, this body 17 may be previously covered with rubber or latex, preferably of a greater resiliency or softer than that of the tire, the cover will form a body 25 as that shown in Fig. 3 of the accompanying drawings, that is having a remarkable truncated-cone shape in order to insure its being retained in the tire, although it may also have any other conveniently retentive shape. Said body 25 constituting the cover of the conductor 17 is inserted in the rubber mass of the tire 10, preferably in the thicker section thereof that constitutes the rolling belt of the tire.

Having thus described the invention, what I consider as new and desire to secure by Letters Patent is:

1. A resilient tire including end flanges to contact with metal flanges of a supporting metal wheel rim, metal conductors embedded in and disposed at intervals in the body portion of the resilient tire, the metal conductors extending through the body portion and around the flanges of the tire to contact with the supporting metal wheel rim, the metal conductors each including a flat metal body disposed in the tread portion of the tire, the flat metal body having an extension which projects beyond the tread surface of the tire.

2. A resilient tire as defined in claim 1 wherein the metal body is encased in a mass of resilient material embedded in the tread portion of the tire.

3. A resilient tire as defined in claim 1, wherein the projection of the body of flat metal beyond the tread surface of the tire is provided with an annular groove.

4. A resilient tire as defined in claim 1 wherein a recess is formed on the inner surface of the tread portion of the tire adjacent the flat metal body.

GUILLERMO PALACIOS BRIDGEFIELD.

References Cited in the file of this patent

UNITED STATES PATENTS

| Number | Name | Date |
|---|---|---|
| 589,434 | Hooper | Sept. 7, 1897 |
| 1,797,545 | Churcher | Mar. 24, 1931 |
| 1,945,283 | Loomis | Jan. 30, 1934 |

FOREIGN PATENTS

| Number | Country | Date |
|---|---|---|
| 544,757 | Great Britain | Apr. 27, 1942 |